United States Patent
Pfleging et al.

(10) Patent No.: US 7,526,294 B2
(45) Date of Patent: Apr. 28, 2009

(54) POINT-OF-SALE GAS PUMP WITH ACCESS TO TRAVEL INFORMATION SERVICE

(75) Inventors: Gerald W. Pfleging, Batavia, IL (US); George P. Wilkin, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 471 days.

(21) Appl. No.: 11/388,113

(22) Filed: Mar. 23, 2006

(65) Prior Publication Data
US 2007/0225898 A1    Sep. 27, 2007

(51) Int. Cl.
*H04Q 7/20* (2006.01)
(52) U.S. Cl. .............. 455/456.2; 455/456.3; 455/456.1; 701/201; 340/995.12
(58) Field of Classification Search .............. 455/456.2, 455/456.3, 456.1; 701/201; 340/995.12
See application file for complete search history.

(56) References Cited

U.S. PATENT DOCUMENTS

| | | | | |
|---|---|---|---|---|
| 2002/0161830 | A1* | 10/2002 | Mukaiyama et al. | 709/203 |
| 2003/0212485 | A1* | 11/2003 | Michmerhuizen | 701/200 |
| 2004/0220726 | A1* | 11/2004 | Jin et al. | 701/207 |
| 2005/0099323 | A1* | 5/2005 | Hirose | 340/995.13 |

* cited by examiner

*Primary Examiner*—Danh C Le

(57) ABSTRACT

An exemplary method facilities obtaining travel information. A request for travel information is received from a user by a point-of-sale gas pump at a service station or a wireless router operated in the vicinity of the pas pump. At least a location of a specified destination is received at a server at the service station, where the location of the specified destination is input by the user. Travel information based on the location of the specified destination is determined and conveyed to the user.

19 Claims, 2 Drawing Sheets

US 7,526,294 B2

POINT-OF-SALE GAS PUMP WITH ACCESS TO TRAVEL INFORMATION SERVICE

BACKGROUND

This invention relates to providing location, routing and/or map information to service station users via interaction with a gas pump point-of-sale terminal.

Expectations of consumers with regard to the availability of information continue to increase. With Internet access to various information providers being available to many consumers, users place increasing reliance upon such information and the availability of such information. Although WI-FI (wireless fidelity) cells and high-speed wireless data providers have increased Internet access for mobile users, such wireless coverage is not ubiquitous. Additionally, not all users can justify the costs of subscribing to high-speed wireless data services. Thus, most people while traveling by vehicle do not have or cannot always count on browser-controlled wireless data communications by the Internet.

Service (gas) stations continually seek ways to distinguish themselves and enhance revenue. One approach has been to offer a variety of foods and beverages in addition to the sale of gasoline in a "stop, shop and go" approach. The sale of additional high profit items enhances the overall revenue while simultaneously distinguishing such gas stations over those stations that do not sell such additional items. Such an approach is attractive to many customers since they are already stopped at the gas pump. The sale of food and beverages can be considered an "add-on" purchase in addition to the primary objective of purchasing gasoline. Stations continue to seek additional goods and services that can increase revenue and/or distinguish over competing stations. Therefore, there is a need for additional services that can be offered by service stations that are attractive to their mobile customers.

SUMMARY

It is an object of the present invention to provide automated route/map services to customers of service stations in accordance with this need.

In one embodiment, an exemplary method facilitates obtaining travel information. A request for travel information is received from a user by a point-of-sale gas pump at a service station. At least a location of a specified destination is received at a server at the service station, where the location of the specified destination is input by the user. Travel information based on the location of the specified destination is determined and conveyed to the user.

In another embodiment, a request for travel information is received from a user's wireless communication device by a wireless router operated in the vicinity of a point-of-sale gas pump at a service station. At least a location of a specified destination is received at a server at the service station, where the location of the specified destination is input by the user. Travel information based on the location of the specified destination is determined and conveyed to the user.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition of the difficulties associated with obtaining directions while traveling via a vehicle during a journey. While on a journey the traveler may stop at an intermediate location such as a service station or other business and ask directions. However, the staff may not be knowledgeable about directions to a particular location or may simply not be good with directions in general. And even if directions are offered by a staff member, these directions may not be accurate or may be misunderstood.

A reliable source of routes/maps to a particular destination would be valuable to many travelers. A service station (or chain of service stations) that could provide travelers with automated access to a reliable source of routes/maps to a user specified destination would be in a position to benefit from this service by increased revenue directly or indirectly as well as distinguishing itself with respect to competing service stations. As used herein "travel information" refers to all forms of information that would be useful in helping a traveler locate and reach a specified destination. Travel information includes, but is not limited to, maps, geographic locations of a point of origination and destination, and routes between the point of origination and destination.

Figure 1:
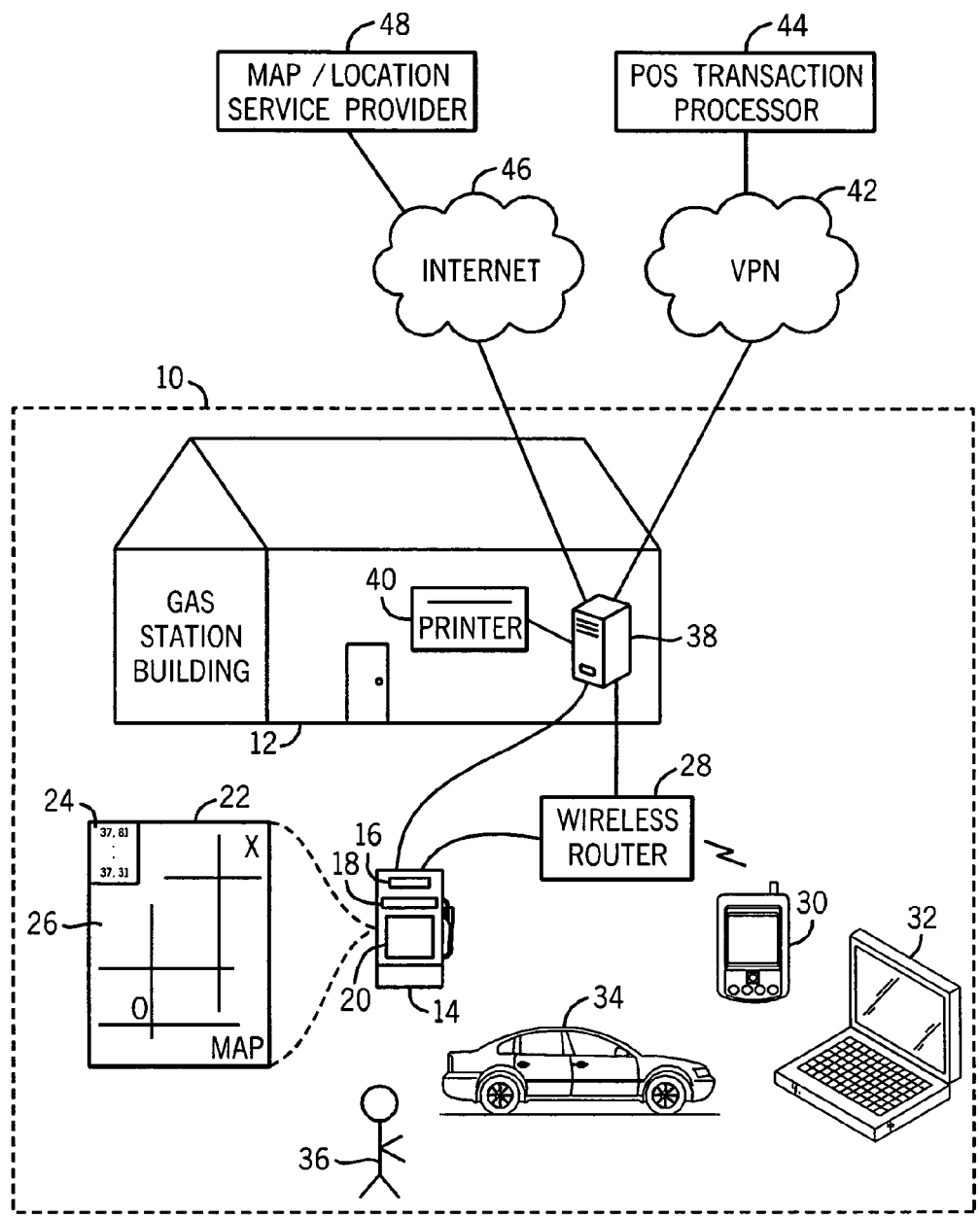
FIG. 1 is a block diagram of a system suited for supporting route/map services to service station customers.

FIG. 1 is an illustrative diagram of structure suited for supplying the services as will be described below. Service station premises 10 includes a gas station building 12 and an exemplary gas pump 14. One or more attendants will typically be working in building 12 which contains a variety of food, beverage and sundry items for sale. Gas pump 14 includes a display 16 that indicates a running total of the amount of gasoline being pumped, both in price and volume measure. A slot 18 provides an opening from which paper printed by a local printer in the gas pump is ejected. A larger screen display 20 provides information to the user in the form of alphanumeric characters as well as graphic images. In order to obtain input from the user, a display 20 may comprise a touch screen configured with a plurality of menus and icons suited for receiving input instructions and information from the user. Alternatively, various other structures can be provided for accepting input from the user.

An illustrative sheet or length of paper 22 can be printed and ejected from slot 16 by gas pump 14. In the illustrative example, the sheet of paper 22 contains a portion 24 that consists of a receipt documenting the payment for gasoline purchased by the user as well as any other auxiliary services, e.g. routing instructions and/or map, purchased by the user. The portion 26 of the paper 22 comprises a map showing connecting roadways to enable the user to travel from the current service station location indicated by "O" to a user defined destination indicated by "X".

Various techniques can be utilized to accept input from a user as well as provide output to the user. For example, one or more wireless WI-FI routers 28 utilizing the IEEE 802.11 standard communication protocol can be located in the vicinity of the gas pumps for providing bidirectional communications between user operated communication devices, such as a personal digital assistant (PDA) 30 or a laptop computer 32 with WI-FI communication capability, and the service station system that supports obtaining and providing directions/maps to assist the user. Alternatively, user operated communication devices may be associated with or attached to the vehicle 34 operated by a user 36. The utilization of input devices by the user as well as the receipt of output information desired by the user will be explained in detail below.

In this illustrative example wireless router 28 is connected to the gas pump 14 and to the communication server 38 located in building 12. Although wireline and/or optical channels are illustrated as connecting the wireless router, it will be appreciated that wireless connections utilizing the WI-FI communication capabilities of the router could also be utilized. The server 38 may comprise a conventional desktop computer or workstation controlled by a microprocessor that is supported by an architecture that includes read-only memory (ROM), random access memory (RAM), nonvolatile data storage such as a hard drive, input/output module for supporting incoming and outgoing data communications as well as conventional user input devices such as a keyboard and mouse, and user output devices such as a monitor and a printer 40. As will be understood by those skilled in the art, the computer operates under the control of an operating system and application specific programs designed to provide the functionality as described herein. In a preferred embodiment, printer 40 is capable of providing a higher resolution output than the printing device contained in gas pump 14, and may provide enhanced features such as color printing to enhance the route/map information to be output for the user.

The server 38 is connected by a virtual private network (VPN) 42 with a POS transaction processor 44 that includes the required processing to authorize and accept credit and debit cards tendered by users for payment of gasoline and services purchased at the service station such as at gas pump 14. Alternatively, the server 38 could be connected to a dial-up connection or other form of communication linking it to a transaction processor 44 instead of a dedicated VPN channel. The server 38 is also connected by a channel to the Internet 46 which serves information providers and users, including a map/location service provider 48. The provider 48 may comprise a private information provider that serves a variety of clients including the subject service station. Alternatively, the provider 48 may comprise one of the known Internet routing/map service providers that provides such information free of charge, e.g. Mapquest, Google, etc. Alternatively, the server 38 can obtain requested travel information from storage in a local database connected to it.

In general, a user 36 may request directions/map information as part of the interaction with gas pump 14 while obtaining gasoline. The gas pump 14 and/or wireless router 28 associated with the service station receives user input requesting directions and/or map information for roadway travel directions from the service station (or a specified point of departure) to a destination specified by the user. This information is transmitted in appropriate format as a query to the map/location service provider 48 via server 38. The response by provider 48 to the query is transmitted by server 38 to an output device that may be selected by the user or by the service station depending upon the configuration as determined by the service station. For example, a printed output containing the direction/map information can be provided to the user by gas pump 14 or by printer 40. Alternatively, this information could be displayed to the user on screen 20 or transmitted to a wireless communication device of the user such as PDA 30 or laptop 32 where the information can be stored for later retrieval by the user.

Depending on the marketing of this service by the service station, the service can be configured to be free as an inducement to buy gasoline and products at the service station. In this scenario the output may only be made available at printer 40 in hopes that the user will buy other items while in the building. This service can be configured to be purchased by the user as an add-on purchase to a gasoline purchase, and can be merely added to the same credit/debit card transaction used to buy the gasoline. The service can be offered for a displayed fee if the user desires to complete the transaction and obtain the travel information without going into the service station building. Alternatively, the service can be offered at a reduced rate or free if the user agrees to enter the building and pick up the results printed by printer 40. The service station can configure the payment structure, if any, and the input/output options made available to the user to best balance the value of the service to both the user and the station.

Figure 2:
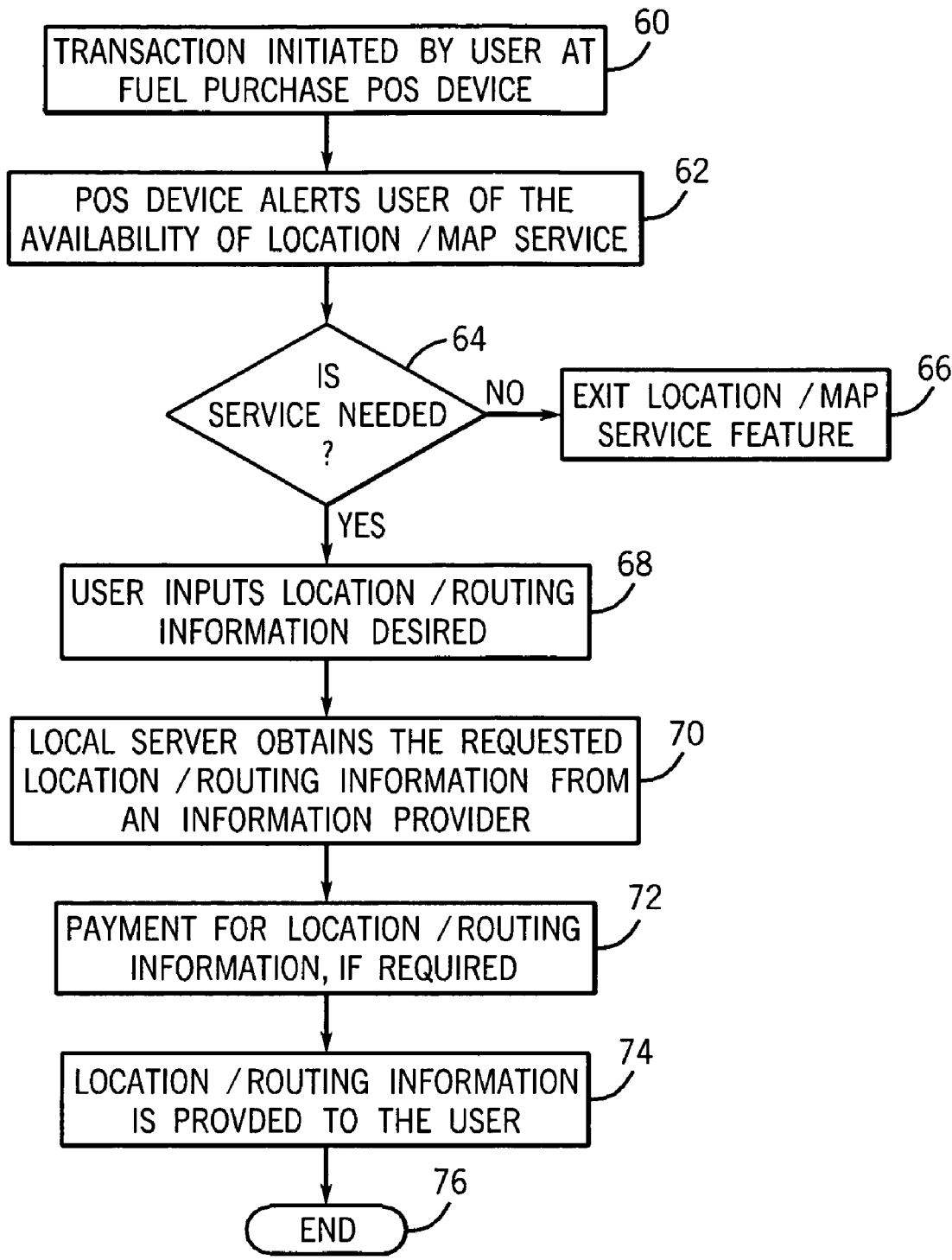
FIG. 2 is a flow diagram of illustrative steps in accordance with the providing of such services.

FIG. 2 is a flow diagram of illustrative steps in accordance with one embodiment of a method in accordance with the present invention. In step 60 the user initiates a transaction at a service station as part of the purchase of fuel using a POS device such as incorporated in a fuel dispensing pump 14. In step 62 the POS device alerts the user of the availability of a travel information service. For example, the display 20 of gas pump 14 can convey this service availability. Alternatively, the availability of the service can be made known to the service station customer near a gas pump by an audible announcement or other printed advertisements or electronic displays within the view of the customer.

In step 64 a determination is made of whether the offer to provide the service is accepted by the customer. The acceptance can be conveyed by the user entering a predetermined key or button on the gas pump, by the user pressing a predetermined symbol or word on touch-screen display 20, or by other form of conventionally known input mechanisms or signals. Part of the acceptance procedure may include an election offered to the user of the method of communicating input and/or receiving output associated with the service. For example, a user with an electronic communication device that includes a short range wireless communication capability, such as Bluetooth, infrared, WI-FI, etc., can be provided with an election indicated on display 20 to choose such a device to transmit input information and/or to receive outputs. In order to identify a specific customer's electronic device, a user identification code or password can be created and provided to the customer such as by displaying it on screen 20 following the election by the user to utilize an external electronic device. A NO determination by step 64 terminates further steps associated with the providing of the subject service as indicated by exiting the service feature per step 66.

A YES determination by step 64 leads to step 68 in which the user inputs the location(s) for which travel information desired. This can be accomplished using a variety of techniques. For example, the user can identify a starting location (the service station location being the default) and a destination by indicating locations on a map displayed by screen 20. Alternatively, or in addition to the use of a displayed map, the user can identify a location, typically the destination, by entering alphanumeric characters that specify a street address, city, state, or a location in terms of distance from an identified intersection or landmark. If using an external communication device, the user will preferably enter a previously provided identification code or password prior to entering the origination location and destination. The information entered by the user is transmitted by gas pump 14 and/or wireless router 28 to server 38. In step 70 the server 38 transmits the information received from the user to the map/location service provider 48 and receives a response to this query containing the travel information generated by provider 48. In step 72 payment, if required, by the user for such travel information services is obtained. Payment may comprise authorization by the user for an additional charge to the pending gasoline purchase transaction at pump 14. It will be apparent that authorization for any required payment can be obtained from the user at substantially any stage of the process, but is preferably implemented prior to delivery to the user of the travel information.

In step 74 the travel information is provided by server 38 to the user. If this output is to be printed, it can be provided to the user from pump 14 or printer 40 under circumstances as explained above. The output can be displayed to the user on screen 20 as the only form of output or concurrently with the delivery of a printout. If an election was made available to the user to utilize an external communication device, the output can be transmitted to the selected communication device as the only form of output or concurrently with the delivery of a printout. Storing the output information on a portable communication device permits the user to access the information as needed, and if desired, transmit a copy of the output information to a traveling companion that is traveling in a separate vehicle to the same destination. Further, if the portable communication device contains application software specifically directed to providing visual and/or audible driving directions, the output information can be processed to provide increased functionality such as by providing audible turn-by-turn driving directions, especially where the application software does not have access to a database containing appropriate location information for the requested travel. Processing terminates at END 76.

Although exemplary implementations of the invention have been depicted and described in detail herein, it will be apparent to those skilled in the art that various modifications, additions, substitutions, and the like can be made without departing from the spirit of the invention. For example, The scope of the invention is defined in the following claims.

We claim:

1. A method for obtaining travel information comprising the steps of:
   receiving a request for travel information from a user by a point-of-sale gas pump at a service station;
   receiving at least a location of a specified destination at a server at the service station, where the location of the specified destination is input by the user;
   determining travel information based on the location of the specified destination;
   conveying the travel information to the user.

2. The method of claim 1 wherein the step of receiving the request comprises receiving a command entered on the point-of-sale gas pump by the user.

3. The method of claim 1 wherein the step of receiving a request for travel information comprises the point-of-sale gas pump at a service station receiving said request from the user and the point-of-sale gas pump transmitting said request to the server at the service station.

4. The method of claim 1 wherein the step of conveying comprises delivering a printout of the travel information by the gas pump.

5. The method of claim 1 wherein the step of conveying comprises delivering a printout of the travel information by a printer located in a service station building.

6. The method of claim 1 wherein the step of conveying comprises transmitting the travel information via a wireless communication link to a mobile electronic device of the user, where the wireless communication link includes a wireless router coupled to a communication system of the service station.

7. The method of claim 1 wherein the step of receiving the at least location of the specified destination comprises receiving the at least location over a wireless communication link by a wireless router coupled to a communication system of the service station, a wireless communication device of the user being utilized to transmit the at least location over the wireless communication link.

8. The method of claim 1 wherein the request is received at the point-of-sale gas pump prior to completion of an ongoing transaction for the delivery of fuel by the gas pump.

9. The method of claim 8 further comprising the step of incorporating the payment for services associated with the providing of the travel information with authorization of payment of fuel at the gas pump by the user so that payment for both the travel information services and fuel comprise part of a single payment transaction.

10. The method of claim 1 further comprising the step of displaying by the gas pump a plurality of choices selectable by the user for receiving the results of the request for travel information.

11. The method of claim 10 wherein one of the plurality of choices comprises receiving the results of the travel information request on a wireless communication device of the user, and further comprising the step of assigning a code required to be utilized by the wireless communication device in order to receive the travel information.

12. A method for obtaining travel information comprising the steps of:
   receiving a request for travel information from a user's wireless communication device via a wireless router coupled to a point-of-sale gas pump at a service station and a server at the service station;
   receiving via the wireless router at least a location of a specified destination at the server at the service station, where the location of the specified destination is determined by an input by the user;
   determining travel information by the server based at least in part on the location of the specified destination;
   conveying the travel information to the user.

13. The method of claim 12 wherein the wireless router connected to a point-of-sale gas pump at a service station and a server at the service station.

14. The method of claim 12 wherein the step of conveying comprises delivering a printout of the travel information by the gas pump.

15. The method of claim 12 wherein the step of conveying comprises delivering a printout of the travel information by a printer located in a service station building.

16. The method of claim 12 wherein the request is received prior to completion of an ongoing point-of-sale gas pump transaction for the delivery of fuel by the gas pump.

17. The method of claim 16 further comprising the step of incorporating the payment for services associated with the providing of the travel information with authorization of payment of fuel at the gas pump by the user so that payment for both the travel information services and fuel comprise part of a single payment transaction.

18. The method of claim 12 further comprising the step of displaying by the gas pump a plurality of choices selectable by the user for receiving the results of the request for travel information.

19. The method of claim 18 wherein one of the plurality of choices comprises receiving the results of the travel information request on a wireless communication device of the user, and further comprising the step of assigning a code required to be utilized by the wireless communication device in order to receive the travel information.

* * * * *